H. R. HUGHES.
ROLLER DRILL.
APPLICATION FILED DEC. 27, 1910.

1,010,406.

Patented Nov. 28, 1911.

Witnesses:
Geo. R. Letson
Nelle L. Church

Inventor:
Howard R. Hughes.
By Paul Bakewell, atty.

UNITED STATES PATENT OFFICE.

HOWARD ROBARD HUGHES, OF HOUSTON, TEXAS.

ROLLER-DRILL.

1,010,406.  Specification of Letters Patent.  Patented Nov. 28, 1911.

Original application filed July 15, 1909, Serial No. 507,678. Divided and this application filed December 27, 1910. Serial No. 599,526.

*To all whom it may concern:*

Be it known that I, HOWARD R. HUGHES, a citizen of the United States, residing at Houston, Texas, have invented a certain new and useful Improvement in Roller-Drills, of which the following is a full, clear, and exact description, such as will enable others skilled in the art to which it appertains to make and use the same.

This invention relates to roller boring drills, and is a divisional of my pending application Serial No. 507,678, filed July 15, 1909.

One object of my invention is to provide a drill having a roller spindle that is composed of a plurality of separate parts which are detachably connected to the head of the drill.

Another object is to provide a drill having a roller spindle of the same general type as that described in my parent application above referred to, but which is so constructed that a one-piece ring can be used for locking the roller on the spindle.

Figure 1:
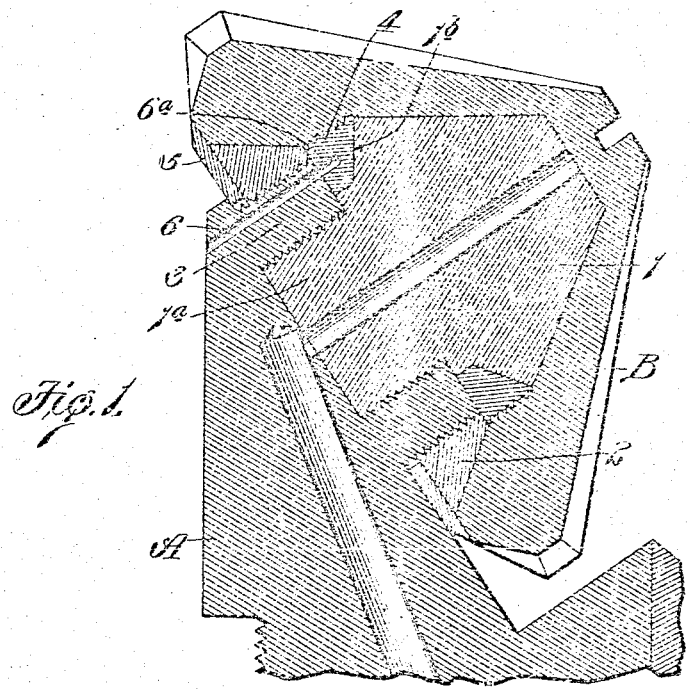
Figure 2:
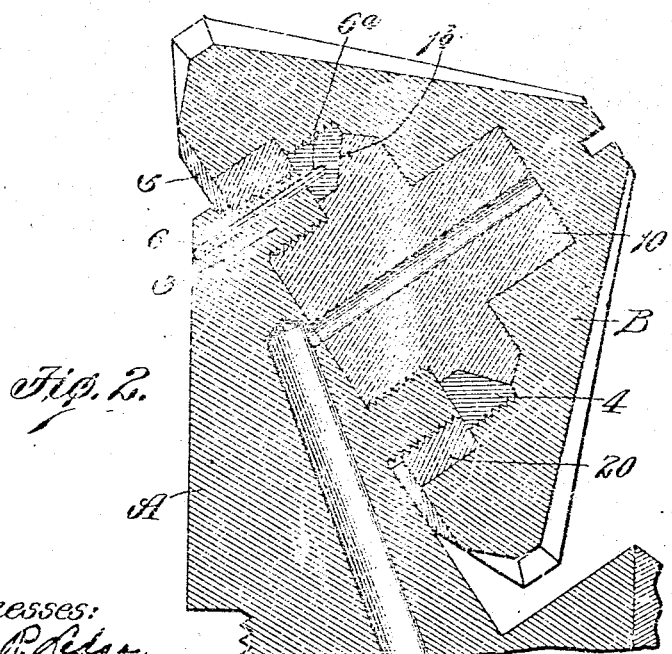

Figure 1 of the drawings is a vertical sectional view illustrating a portion of a drill constructed in accordance with my invention; and Fig. 2 is a similar view illustrating a modified form of my invention.

Referring to Fig. 1 of the drawings, A designates part of the head of the drill, and B designates an approximately frusto-conical-shaped cutting roller that is mounted on said head. The spindle on which said roller is mounted consists of two portions 1 and 2, both of which are detachably connected to the head of the drill. The portion 1 forms the outer end of the spindle, and is provided with an externally screw-threaded shank 1ª that fits in an internally screw-threaded annular-shaped flange 3 on the head, and the portion 2 which forms the inner end of the spindle, is substantially ring-shaped, and is provided with internal screw-threads that coöperate with external screw-threads on said annular flange 3. The end portion 1 of the spindle is approximately frusto-conical-shaped, and the outer surface or bearing surface of the inner portion 2 of the spindle is substantially cone-shaped and of the same angularity as the bearing surface of the frusto-conical-shaped end portion 1 so as to provide a true bearing surface for the roller B.

The roller B is retained in operative position on the spindle by means of a one-piece locking ring 4 that fits between the annular flange 3 on the head and the end portion 1 of the spindle which is undercut or grooved at 1ᵇ as shown in Fig. 1 so as to receive the ring 4, said locking ring 4 being provided with external screw-threads that coöperate with screw-threads on the spindle socket or bore formed in the roller. If desired, a washer 5 can be arranged between the head and the removable inner end portion 2 of the spindle so as to prevent said parts from wearing out quickly.

In assembling the parts above described I first arrange the washer 5 in operative position, then screw the removable portion 2 onto the annular flange 3 on the head, and then arrange the locking ring 4 in the groove or undercut part of the end portion 1 of the spindle and screw said end portion 1 into the annular flange 3 on the head. The final operation is to screw the roller B onto the locking ring 4, and in order that said ring may be held stationary while the roller is being screwed onto same I have provided the head with a hole or passageway 6 through which a pin or other suitable device (not shown) can be inserted so as to engage the locking ring 4 which is preferably provided with a recess or hole 6ª for receiving the end of said pin or tool. After the roller has been screwed onto the ring 4 the pin or device which is used to hold said ring stationary, is removed so as to permit the ring to rotate with the roller.

With a drill of the construction above described it is not necessary to discard the head when the spindles become worn because each spindle is made up of a plurality of separate parts that are detachably connected to the head, and consequently, the rollers of a drill of the construction above referred to can be kept trued up with very little expense.

In Fig. 2 I have illustrated a slightly modified form of my invention in which the end portion 10 of the spindle is cylindrical-shaped instead of tapered or conical-shaped as in the construction shown in Fig. 1, the removable inner end portion 20 of the spindle also being cylindrical-shaped instead of tapered. In other respects, the drill illustrated in Fig. 2 is substantially the same as that shown in Fig. 1 as the outer end portion 10 of the spindle is provided with a shank that is screwed into the annular-shaped flange 3 on the head, and the inner end portion 20 of the spindle is also screwed onto said annular flange.

Having thus described my invention, what I claim as new and desire to secure by Letters Patent is:

1. A roller drill having a head provided with a spindle that consists of a plurality of separate parts that are detachably connected to the head, and a roller mounted on said spindle.

2. A drill comprising a head, a removable spindle portion detachably connected to said head, a separate removable spindle portion connected to said head and arranged adjacent the inner end of the spindle portion first referred to, and a roller mounted on said spindle portions.

3. A drill having a head provided with a substantially annular-shaped flange, and a roller-supporting spindle comprising a part that is screwed into said flange, and a separate part that is screwed onto said flange so as to surround same.

4. A roller boring drill having a head provided with a substantially annular-shaped flange, a spindle portion having a screw-threaded shank that projects into said flange, a substantially ring-shaped member detachably connected to said flange and co-operating with said spindle portion to form a bearing surface, and a roller mounted on said bearing surface.

5. A boring drill comprising a head provided with a socket, a removable spindle portion provided with a shank that projects into said socket, a roller mounted on said spindle portion, and a locking ring screwed into said roller and lying between said head and spindle portion for retaining said roller in position.

6. A roller boring drill, comprising a head provided with a socket, a removable roller-supporting member provided with a shank that projects into said socket, a one-piece locking ring loosely mounted on said member, and a roller secured to said ring so that it will rotate with same.

7. A roller boring drill, comprising a head provided with an internally screw-threaded socket, a roller-supporting device provided with an annular groove or undercut part and also an externally screw-threaded shank that fits in the socket in said head, a roller mounted on said device, and a locking ring arranged on the inside of said roller that projects into said groove and thus retains the roller in operative position.

8. In a roller drill, the combination of a head provided with a socket, a roller provided with an internal bore, a one-piece locking ring arranged inside of said bore, and a supporting device for said roller provided with a shank that projects into said socket and also having an enlarged end portion that laps over the locking ring on the roller.

9. In a drill, a head provided with a removable member that has a tapered bearing surface, a roller supporting device detachably connected to said head, and a roller rotatably mounted on said device and surrounding said removable bearing surface.

10. A drill provided with a head in which a socket is formed, a ring-shaped member detachably connected to said head to form a removable bearing surface, a roller-supporting device having a threaded portion that projects into the socket in said head, and a roller mounted on said device and surrounding said bearing surface.

11. A roller boring drill comprising a head, a spindle on said head comprising two separate parts that are detachably connected to the head, said parts being spaced away from each other, a roller mounted on said spindle, and means on said roller projecting into the space between the parts of said spindle so as to prevent the roller from moving longitudinally of the spindle.

In testimony whereof I hereunto affix my signature in the presence of two witnesses, this 9th day of December, 1910.

HOWARD ROBARD HUGHES.

Witnesses:
O. C. DOUD, Jr.,
GEO. H. PRUTER.